(12) United States Patent
Nishimura et al.

(10) Patent No.: US 11,799,146 B2
(45) Date of Patent: Oct. 24, 2023

(54) ENERGY STORAGE APPARATUS

(71) Applicant: GS Yuasa International Ltd., Kyoto (JP)

(72) Inventors: Yosuke Nishimura, Kyoto (JP); Nobuyuki Naganawa, Kyoto (JP); Kenta Yoshioka, Kyoto (JP); Yoshimasa Toshioka, Kyoto (JP); Eiji Yuasa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 402 days.

(21) Appl. No.: 17/251,981

(22) PCT Filed: Jun. 21, 2019

(86) PCT No.: PCT/JP2019/024700
§ 371 (c)(1),
(2) Date: Dec. 14, 2020

(87) PCT Pub. No.: WO2019/245028
PCT Pub. Date: Dec. 26, 2019

(65) Prior Publication Data
US 2021/0257697 A1    Aug. 19, 2021

(30) Foreign Application Priority Data

Jun. 22, 2018    (JP) ................. 2018-118815

(51) Int. Cl.
*H01M 50/209*    (2021.01)
*H01M 10/6557*    (2014.01)
(Continued)

(52) U.S. Cl.
CPC ..... *H01M 10/647* (2015.04); *H01M 10/6557* (2015.04); *H01M 50/209* (2021.01);
(Continued)

(58) Field of Classification Search
CPC ........ H01G 11/10; H01G 11/12; H01G 11/18; H01G 11/76; H01G 11/82; H01G 2/04;
(Continued)

(56) References Cited

U.S. PATENT DOCUMENTS

| | | |
|---|---|---|
| 2015/0228947 A1 | 8/2015 | Nagamine et al. |
| 2018/0138560 A1 | 5/2018 | Bessho |

(Continued)

FOREIGN PATENT DOCUMENTS

| | | |
|---|---|---|
| JP | 2009-170258 A | 7/2009 |
| JP | 2012-109126 A | 6/2012 |

(Continued)

OTHER PUBLICATIONS

International Search Report (ISR) (PCT Form PCT/ISA/210), in PCT/JP2019/024700, dated Jul. 30, 2019.

*Primary Examiner* — Lingwen R Zeng
(74) *Attorney, Agent, or Firm* — MCGINN I.P. LAW GROUP, PLLC

(57) ABSTRACT

In an embodiment, an energy storage apparatus includes a plurality of energy storage devices arranged in a first direction and a pair of insulators extending in the first direction along the plurality of energy storage devices and arranged at an interval from each other in a second direction orthogonal to the first direction, and each of the plurality of energy storage devices has an outer surface facing a third direction orthogonal to the first direction and the second direction, and each of the pair of insulators has a space forming part extending from a position on the outer surface in the first direction and the third direction, and forming a space between a facing surface, on which the energy storage apparatus is installed, and the outer surface.

20 Claims, 11 Drawing Sheets

(51) Int. Cl.
| | |
|---|---|
| *H01M 10/647* | (2014.01) |
| *H01G 2/08* | (2006.01) |
| *H01M 50/244* | (2021.01) |
| *H01G 11/18* | (2013.01) |
| *H01G 11/76* | (2013.01) |
| *H01M 10/613* | (2014.01) |
| *H01M 50/293* | (2021.01) |
| *H01M 50/262* | (2021.01) |
| *H01G 2/10* | (2006.01) |
| *H01M 50/264* | (2021.01) |
| *H01M 50/291* | (2021.01) |
| *H01G 11/12* | (2013.01) |
| *H01G 11/82* | (2013.01) |
| *H01M 10/653* | (2014.01) |
| *H01M 10/6555* | (2014.01) |
| *H01G 11/10* | (2013.01) |
| *H01M 10/6556* | (2014.01) |
| *H01G 2/04* | (2006.01) |

(52) U.S. Cl.
CPC ............... *H01G 2/04* (2013.01); *H01G 2/08* (2013.01); *H01G 2/106* (2013.01); *H01G 11/10* (2013.01); *H01G 11/12* (2013.01); *H01G 11/18* (2013.01); *H01G 11/76* (2013.01); *H01G 11/82* (2013.01); *H01M 10/613* (2015.04); *H01M 10/653* (2015.04); *H01M 10/6555* (2015.04); *H01M 10/6556* (2015.04); *H01M 50/244* (2021.01); *H01M 50/262* (2021.01); *H01M 50/264* (2021.01); *H01M 50/291* (2021.01); *H01M 50/293* (2021.01); *Y02E 60/10* (2013.01)

(58) Field of Classification Search
CPC ....... H01G 2/08; H01G 2/106; H01M 10/613; H01M 10/647; H01M 10/653; H01M 10/6555; H01M 10/6556; H01M 10/6557; H01M 50/209; H01M 50/244; H01M 50/262; H01M 50/264; H01M 50/291; H01M 50/293; Y02E 60/10
See application file for complete search history.

(56) References Cited

U.S. PATENT DOCUMENTS

| | | | |
|---|---|---|---|
| 2020/0358127 A1* | 11/2020 | Terauchi | H01M 10/653 |
| 2021/0016668 A1* | 1/2021 | Nakahara | H01M 50/209 |

FOREIGN PATENT DOCUMENTS

| | | |
|---|---|---|
| JP | 2014-110190 A | 6/2014 |
| JP | 2014-154509 A | 8/2014 |
| JP | 2018-049786 A | 3/2018 |
| JP | 2018-081790 A | 5/2018 |
| JP | WO2017/017914 A1 | 5/2018 |

* cited by examiner

ENERGY STORAGE APPARATUS

TECHNICAL FIELD

The present invention relates to an energy storage apparatus including a plurality of energy storage devices and in which a fluid for temperature adjustment is supplied between the respective energy storage devices.

BACKGROUND ART

Conventionally, a battery system in which a spacer is arranged between adjacent battery cells is known (see, for example, Patent Document 1). Specifically, as shown in FIG. 11, the battery system includes a plurality of stacked battery cells 102 and a spacer 103 arranged between adjacent battery cells 102. The spacer 103 is provided with a plurality of grooves 110 extending to both side ends in a direction orthogonal to a stacking direction of the battery cells 102 on a facing surface facing the battery cells 102, thereby forming a cooling gap 120 through which a cooling gas such as air is allowed to pass between the spacer 103 and the battery cell 102. The plurality of grooves 110 are provided in parallel with each other at predetermined intervals.

Incidentally, in order to make the fluid for temperature adjustment flow through each cooling gap (flow channel) 120 formed between the adjacent battery cells 102, when the battery system (energy storage apparatus) abuts on a fluid supply member that supplies the fluid, a dedicated fluid supply member corresponding to each structure of the battery system (for example, the dimensions of the battery system in the stacking direction of the battery cells 102) has been required.

PRIOR ART DOCUMENT

Patent Document

Patent Document 1; JP-A-2009-170258

SUMMARY OF THE INVENTION

Problems to be Solved by the Invention

Therefore, in an embodiment, it is intended to provide an energy storage apparatus which can form, when a fluid for temperature adjustment is made to flow, a guide flow channel for supplying the fluid without using a dedicated fluid supply member.

Means for Solving the Problems

An energy storage apparatus of an embodiment includes a plurality of energy storage devices arranged in a first direction; and a pair of insulators extending in the first direction along the plurality of energy storage devices and arranged at an interval from each other in a second direction orthogonal to the first direction, in which each of the plurality of energy storage devices has an outer surface facing a third direction orthogonal to the first direction and the second direction, and each of the pair of insulators has a space forming part extending from a position on the outer surface in the first direction and the third direction, and forming a space between a facing surface, on which the energy storage apparatus is installed, and the outer surface.

MODE FOR CARRYING OUT THE INVENTION

Figure 1:
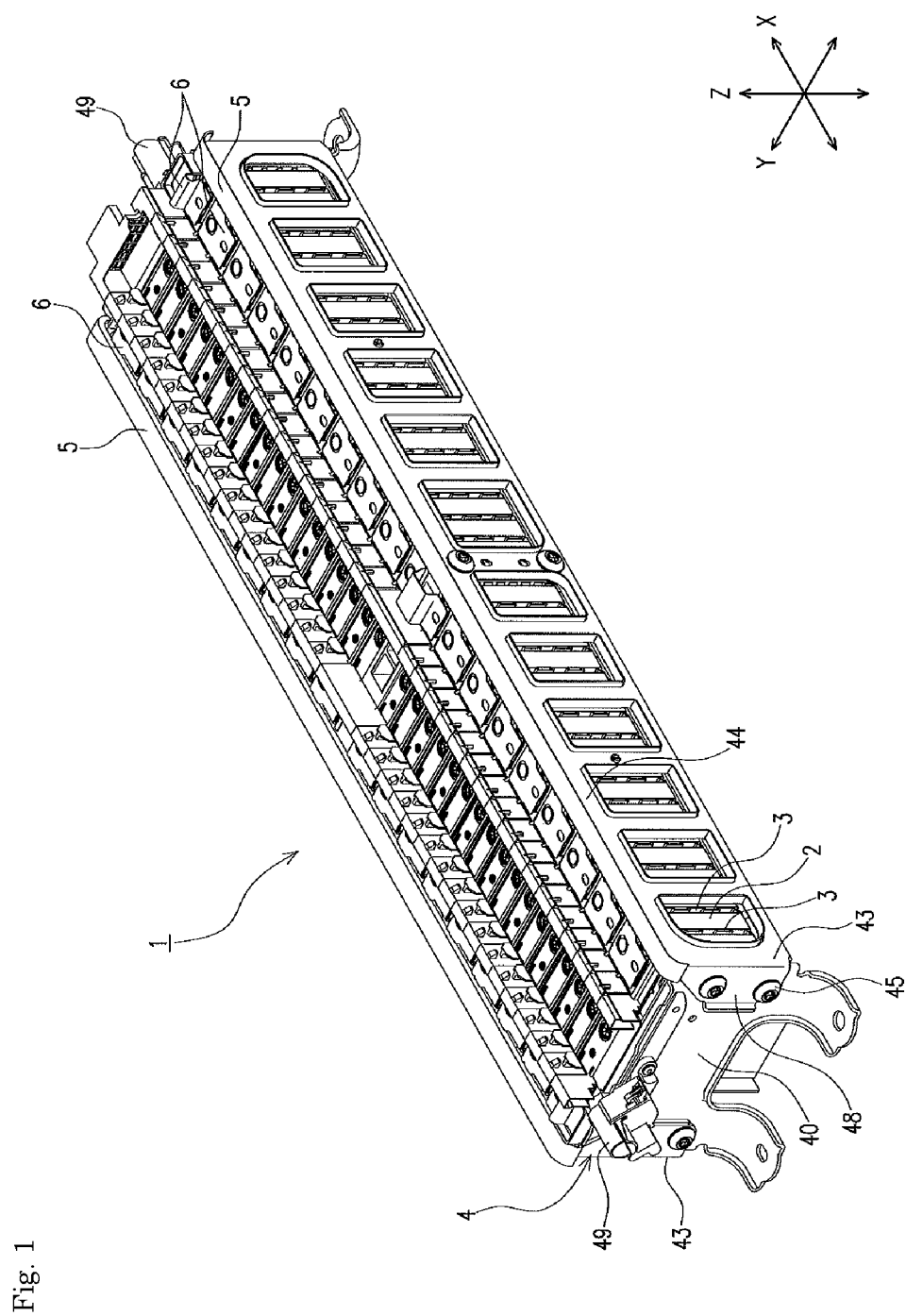
FIG. 1 is a perspective view of an energy storage apparatus according to an embodiment.

An energy storage apparatus of an embodiment includes a plurality of energy storage devices arranged in a first direction; and a pair of insulators extending in the first direction along the plurality of energy storage devices and arranged at an interval from each other in a second direction orthogonal to the first direction, in which each of the plurality of energy storage devices has an outer surface facing a third direction orthogonal to the first direction and the second direction, and each of the pair of insulators has a space forming part extending from a position on the outer surface in the first direction and the third direction, and forming a space between a facing surface, on which the energy storage apparatus is installed, and the outer surface.

According to this configuration, the space forming parts of the pair of insulators form a guide flow channel for supplying a fluid by partitioning the space between the outer surfaces of the plurality of energy storage devices and the facing surfaces, and thus it is possible to supply a fluid by using this guide flow channel without using a dedicated fluid supply member.

In the energy storage apparatus, between the adjacent energy storage devices, a flow channel may be formed which opens between the outer surfaces when the outer surfaces are viewed in the third direction and through which a fluid for temperature adjustment is allowed to flow.

According to such a configuration, the fluid for temperature adjustment supplied to the guide flow channel can be supplied to each flow channel formed between the energy storage devices.

The energy storage apparatus may include an adjacent member arranged outwardly in the first direction with an energy storage device located at an endmost position of the plurality of energy storage devices, in which one of the pair of space forming parts may have a seal rib protruding from an end portion close to the adjacent member in the first direction toward the other of the pair of space forming parts and extending along the third direction, the adjacent member may have, between the pair of space forming parts in the second direction, a connection part extending in the first direction so as to be separated from the energy storage device located at the endmost position and capable of connecting to a fluid supply member capable of supplying the fluid, the connection part may have a seal rib facing surface extending in the third direction at a position facing the seal rib on the outer surface facing the space forming part in the second direction, and the seal rib may be in contact with the seal rib facing surface.

According to such a configuration, when the fluid is supplied from the fluid supply member to the guide flow channel formed by bringing the space forming part into contact with the fluid supply member to bring the seal rib into contact with the seal rib facing surface, leakage of the fluid from between the space forming part and the connection part is suppressed.

In the energy storage apparatus, the seal rib may be in contact with the seal rib facing surface in a state of being curved so that an extension end is displaced to either one side or the other side in the first direction due to elastic deformation.

According to such a configuration, the seal rib is in close contact with the seal rib facing surface in a state of being curved so that the extension end is displaced to either one side or the other side in the first direction due to elastic deformation, and thus even if a manufacturing error or an assembly error occurs in the adjacent member or insulator in the first direction or second direction, it is possible to absorb this error, that is, ensure the airtightness at the inlet of the guide flow channel.

The energy storage apparatus of the present embodiment includes a plurality of energy storage devices arranged in a first direction; and a pair of insulators extending in the first direction along the plurality of energy storage devices and arranged at an interval from each other in a second direction orthogonal to the first direction, in which each of the plurality of energy storage devices has an outer surface facing a third direction orthogonal to the first direction and the second direction, each of the pair of insulators has an insulator main body portion extending in the first direction along the plurality of energy storage devices, and an extending portion extending in the third direction from the main body portion toward a facing surface on which the energy storage apparatus is installed, and a space surrounded by the outer surface, the extending portions of the pair of insulators, and the facing surface extends in the first direction.

According to this configuration, the extending portions of the pair of insulators form a guide flow channel for supplying the fluid by partitioning the space between the outer surfaces and the facing surfaces of the plurality of energy storage devices, and thus it is possible to supply the fluid by using this guide flow channel without using a dedicated fluid supply member.

From the above, according to the present embodiment, it is possible to provide an energy storage apparatus which, when a fluid for temperature adjustment is made to flow in each flow channel formed between the energy storage devices, is capable of forming a guide flow channel for supplying the fluid in each flow channel without using a dedicated fluid supply member.

Hereinafter, an embodiment of the present invention will be described with reference to FIGS. 1 to 10. The name of each component (each constituent element) of the present embodiment is that in the present embodiment, and may differ from the name of each component (each constituent element) in the background art.

Figure 2:
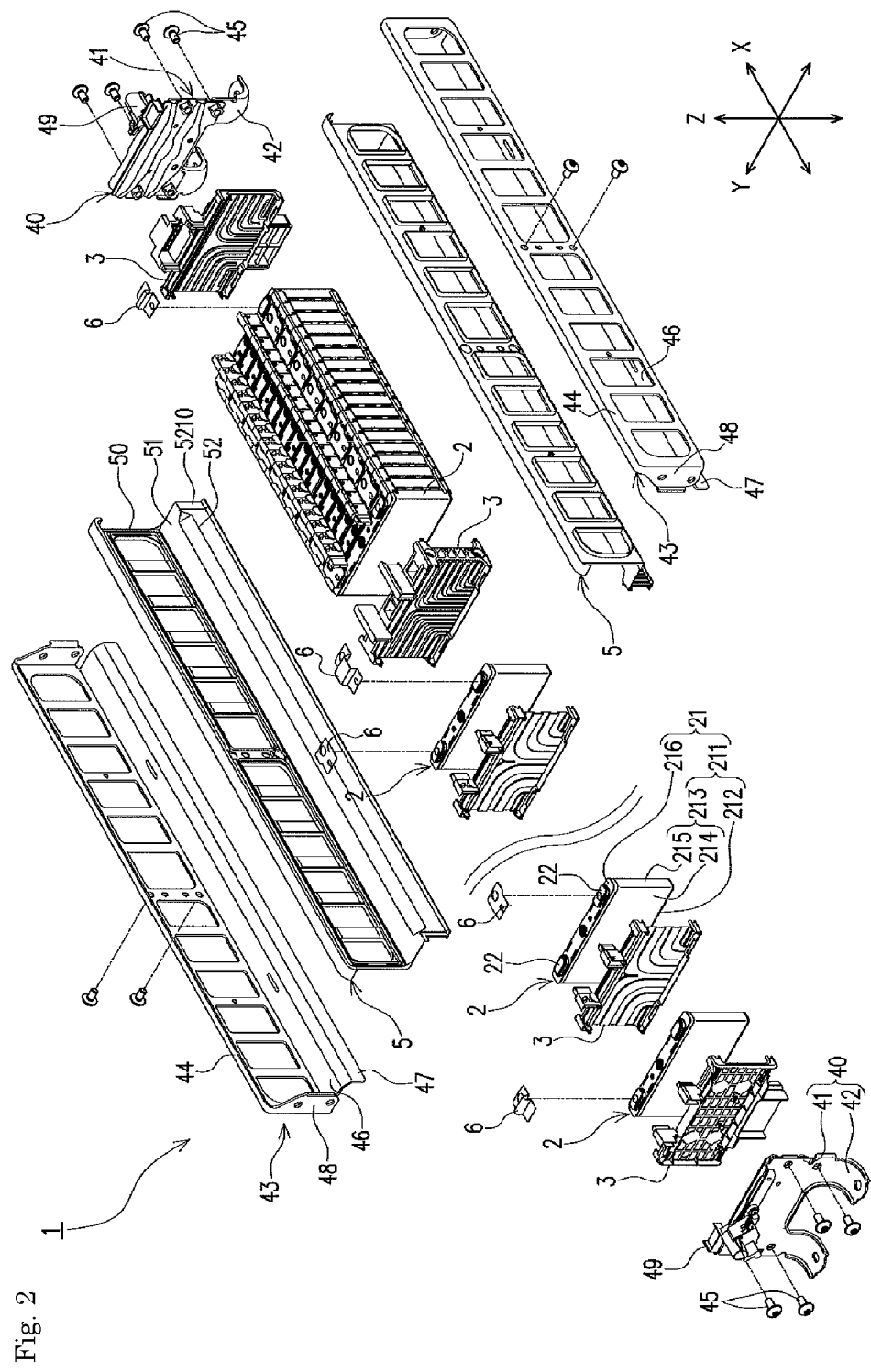
FIG. 2 is an exploded perspective view of the energy storage apparatus.

As shown in FIGS. 1 and 2, the energy storage apparatus includes a plurality of energy storage devices 2 arranged in a predetermined direction, and a pair of insulators 5 extending in a predetermined direction along the plurality of energy storage devices 2. The energy storage apparatus 1 of the present embodiment includes adjacent members 3 adjacent to the energy storage device 2, a holding member 4 that holds a plurality of energy storage devices 2, a bus bar 6 that electrically connects different energy storage devices 2, and an external input/output terminal 49 for input/output of a plurality of energy storage devices 2.

Each of the plurality of energy storage devices 2 may be a primary battery, a secondary battery, a capacitor, or the like. The energy storage device 2 of the present embodiment is a nonaqueous electrolyte secondary battery that can be charged and discharged. More specifically, the energy storage device 2 is a lithium ion secondary battery that utilizes electron transfer generated by the movement of lithium ions. The energy storage device 2 is a so-called prismatic lithium ion secondary battery.

Each of the plurality of energy storage devices 2 has an electrode assembly, a case 21 for accommodating the electrode assembly together with an electrolyte solution, and an external terminal 22 at least a part of which is exposed to the outside of the case 21 (see FIG. 2).

The case 21 has a case body 211 having an opening, and a plate-shaped lid plate 216 that blocks (closes) the opening of the case body 211. The case body 211 of the present embodiment has a bottomed square tube shape, and the case 21 has a flat rectangular parallelepiped shape. The case body 211 includes a rectangular plate-shaped closing portion 212 and a tubular body portion (peripheral wall) 213 connected to the peripheral edge of the closing portion 212. The body portion 213 has a flat square tubular shape. The body portion 213 has a pair of long wall portions 214 extending from the long side at the peripheral edge of the closing portion 212, and a pair of short wall portions 215 extending from the short side at the peripheral edge of the closing portion 212. By connecting the corresponding end portions of the pair of long wall portions 214 to each other by the short wall portion 215, a flat square tubular body portion 213 is formed. The lid plate 216 is a rectangular plate-shaped member that blocks the opening of the case body 211. A pair of external terminals 22 is arranged at an interval on the lid plate 216.

In the energy storage apparatus 1 of the present embodiment, the plurality of energy storage devices 2 are arranged in a state where the long wall portions 214 of the case 21 (case body 211) face each other.

In the following, the predetermined direction (first direction) in which a plurality of energy storage devices 2 are arranged is the X axis of the Cartesian coordinate system, the direction (second direction) in which the short wall portion 215 of the case body 211 faces is the Y axis of the Cartesian coordinate system, and the direction (third direction) in which the outer surface of the closing portion 212 faces is the Z axis of the Cartesian coordinate system.

Figure 3:
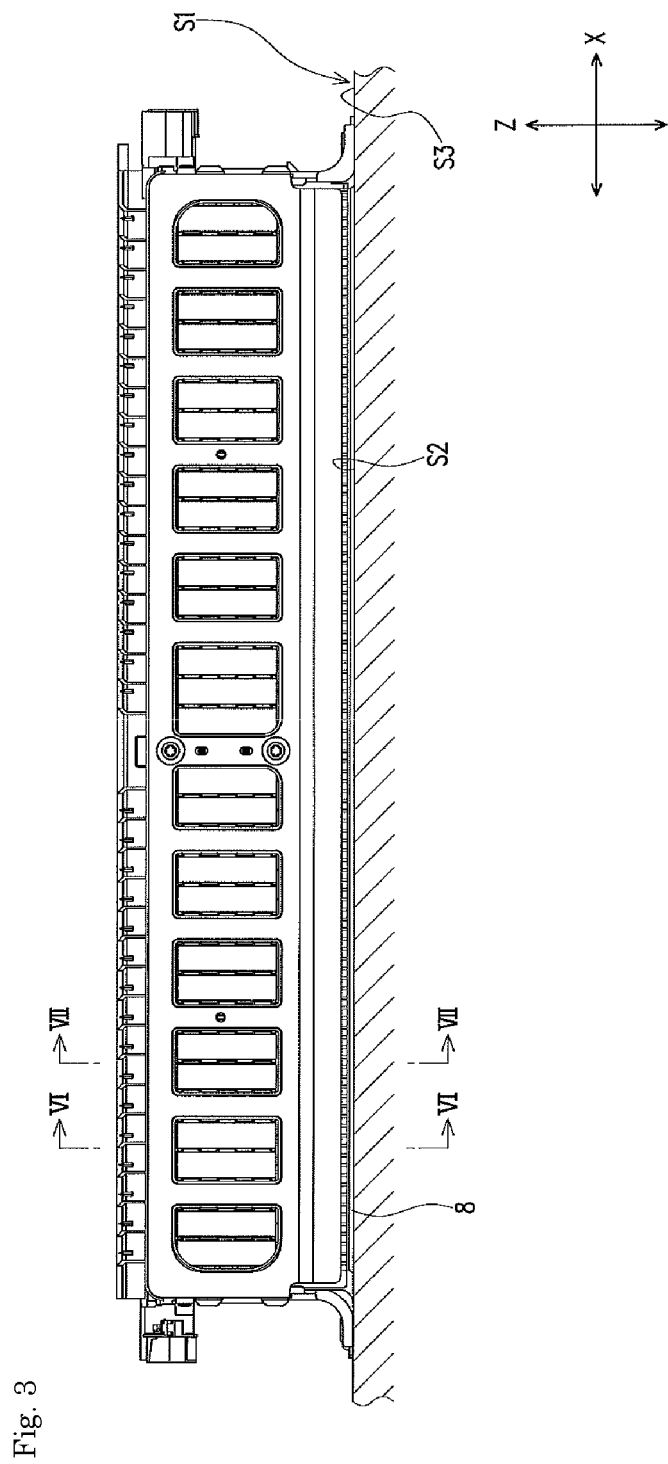
FIG. 3 is a side view explaining a state in which the energy storage apparatus is arranged on an installation surface.
Figure 6:
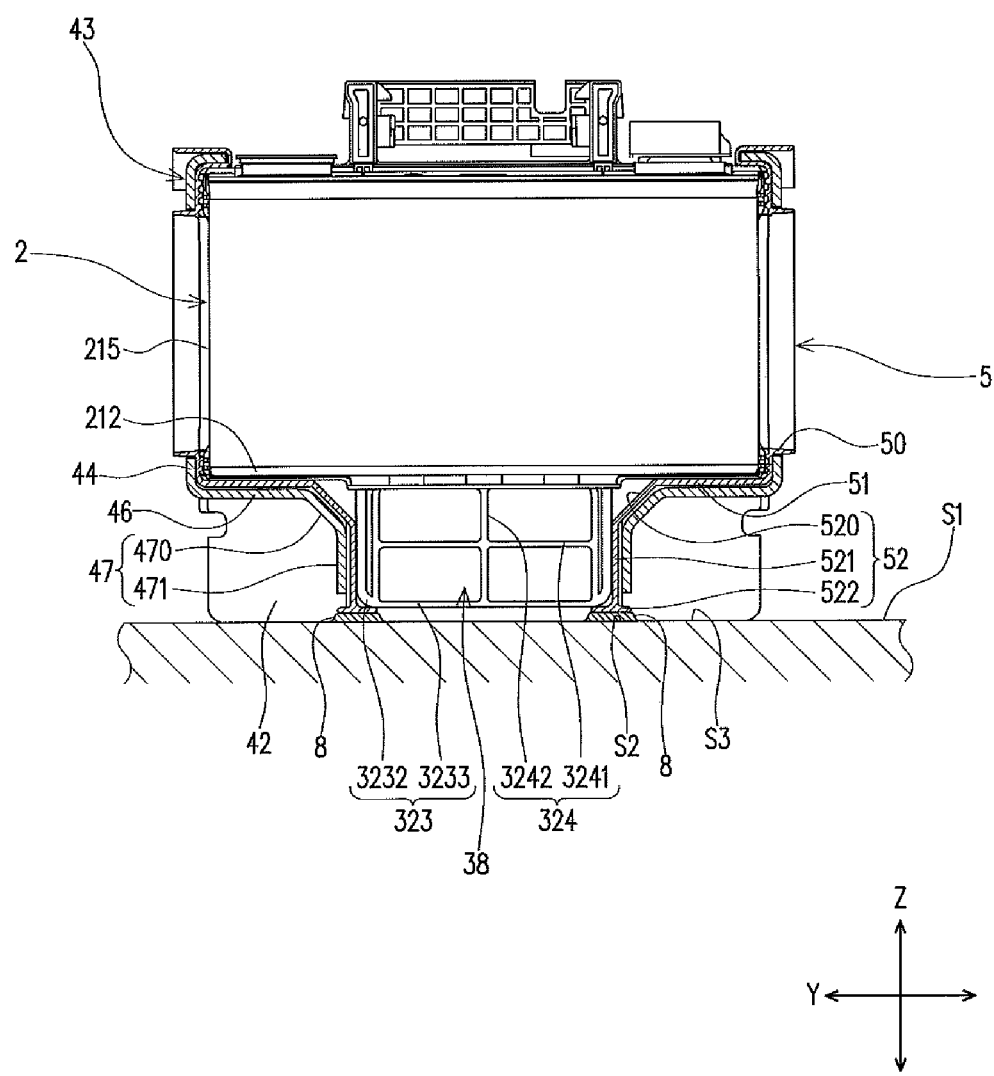
FIG. 6 is a cross-sectional view at a VI-VI position of FIG. 3.
Figure 7:
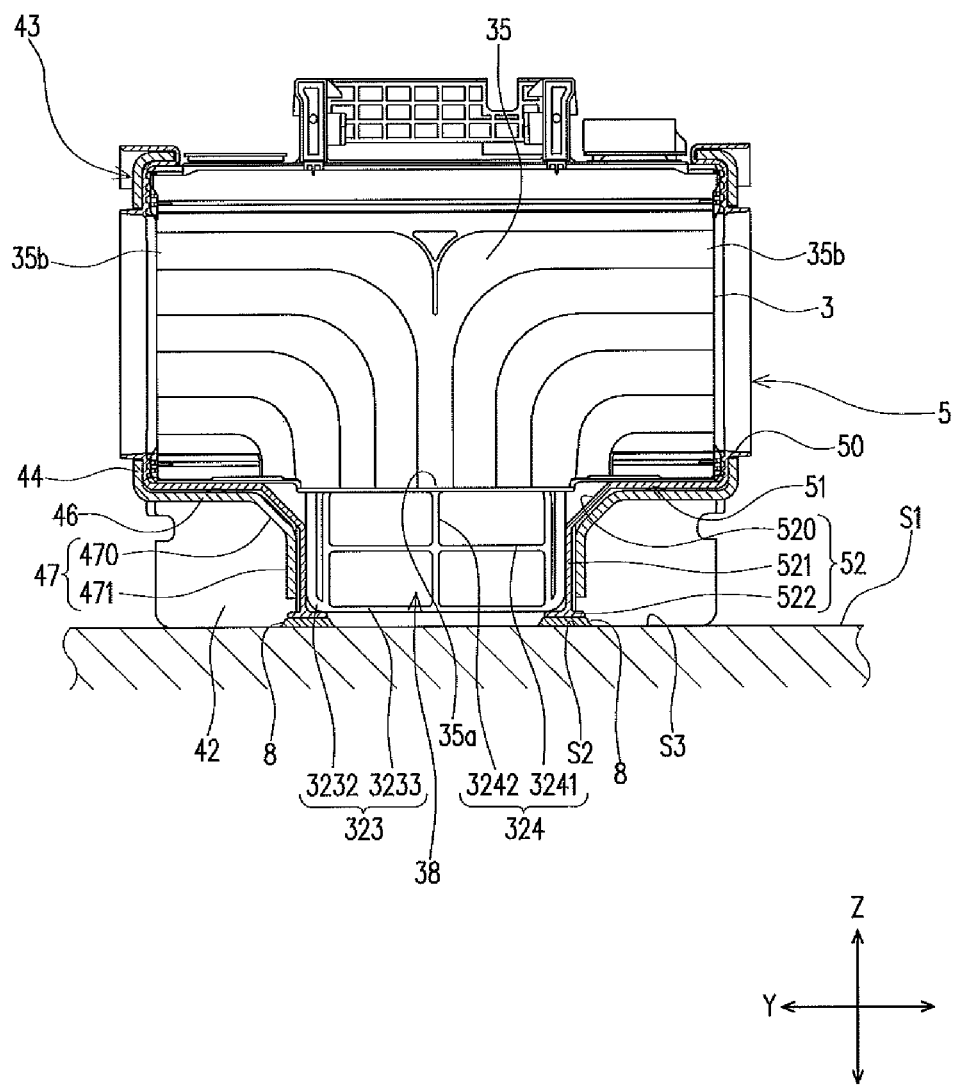
FIG. 7 is a cross-sectional view at a VII-VII position of FIG. 3.
Figure 8:
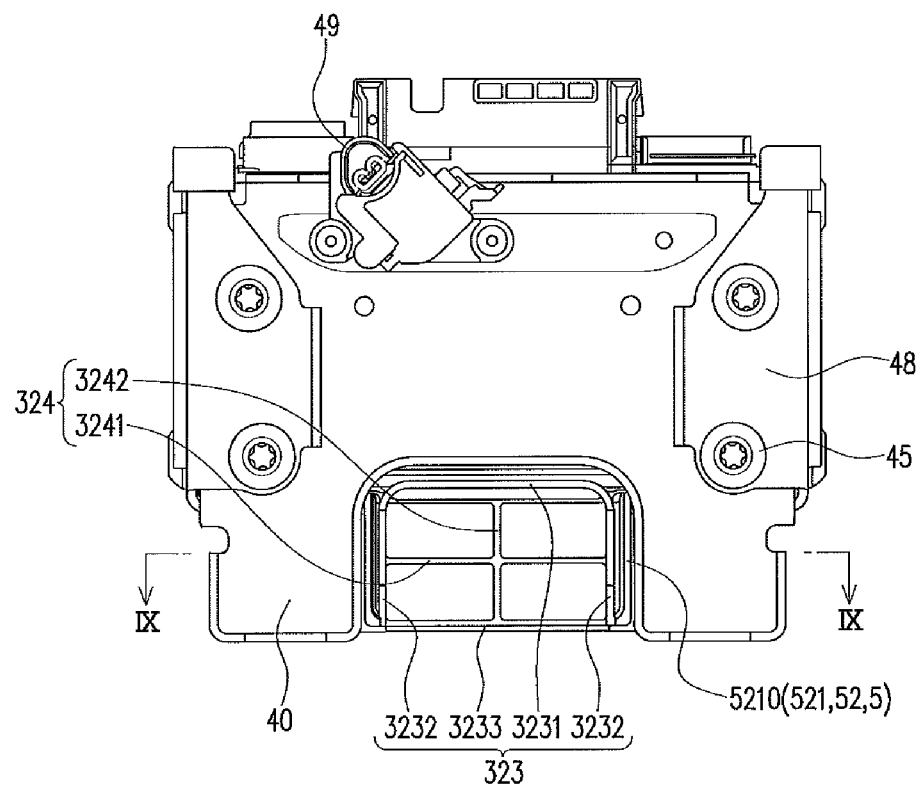
FIG. 8 is a front view of the energy storage apparatus when viewed from one side in the X-axis direction.
Figure 8:
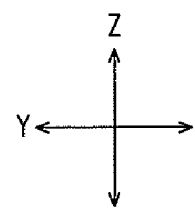

Further, the energy storage apparatus 1 of the present embodiment is installed on an installation surface S1 as shown in FIGS. 3, 6, and 7. When the energy storage apparatus 1 is installed (in the installed state), the installation surface S1 of the present embodiment includes a facing region (opposing surface) S2 in which the outer surfaces (for example, the outer surfaces of the closing portions 212) of the plurality of energy storage devices 2 face at intervals, and an installation region S3 in which both ends of the energy storage apparatus 1 are fixed in the X-axis direction. The installation surface S1 of the present embodiment is a horizontal surface.

The adjacent member 3 is arranged between two energy storage devices 2 adjacent to each other in the X-axis direction (for example, between the respective energy storage devices 2), or between an endmost energy storage device 2 in the X-axis direction and a member (in the example of the present embodiment, a part of the holding member 4) arranged with respect to the energy storage device 2 in the X-axis direction (see FIG. 2). The adjacent member 3 is composed of a member having an insulating property such as resin. Further, the adjacent member 3 forms, between the adjacent member 3 and an adjacent energy storage device 2, a plurality of flow channels 35 through which the fluid for temperature adjustment of the energy storage device 2 can flow (see FIG. 7). At least one of the plurality of flow channels 35 of the present embodiment extends from an opening (inlet) 35a formed at the end position (position corresponding to the closing portion 212 of the energy storage device 2) on the other side of the adjacent member 3 in the Z-axis direction, to openings (outlets) 35b formed at the end positions (positions corresponding to the respective short wall portions 215 of the energy storage device 2) on one side and the other side of the adjacent member 3 in the Y-axis direction. This flow channel 35 is bent at an intermediate position in the longitudinal direction. Further, the opening 35a opens between the outer surfaces of the closing portions 212 arranged in the X-axis direction when the outer surfaces of the closing portions 212 of the energy storage device 2 are viewed from the outside (the other side in the Z-axis direction).

Figure 4:
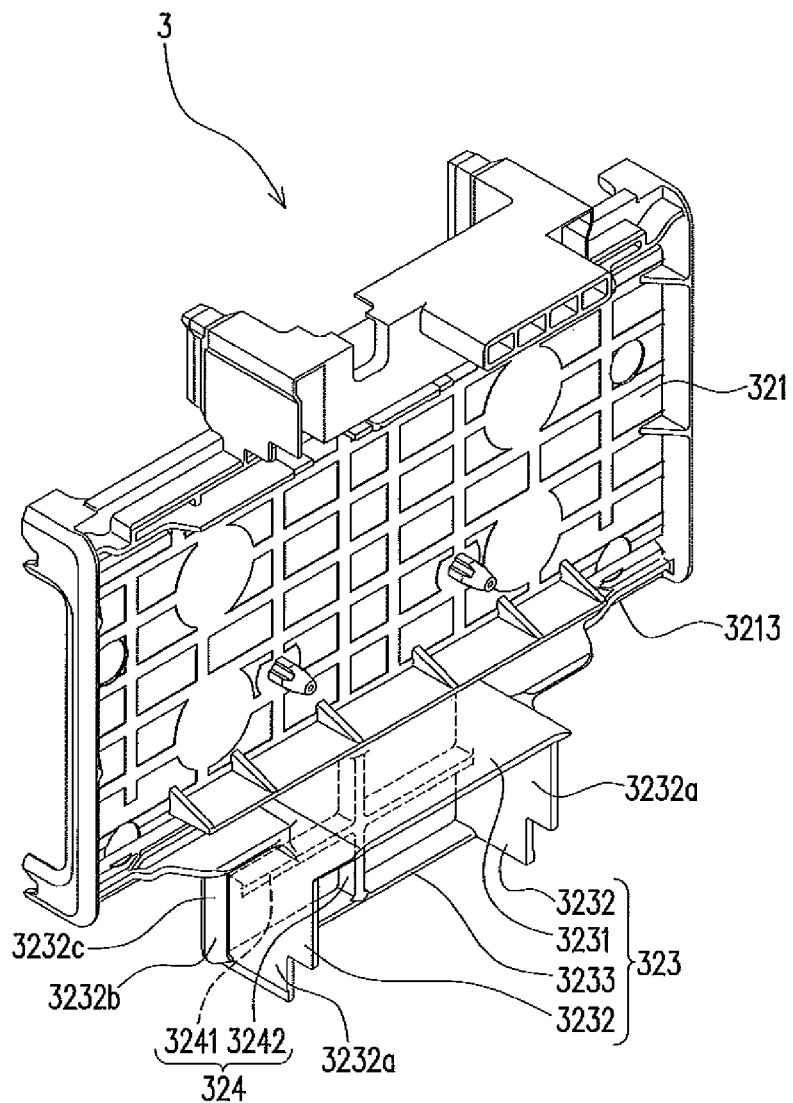
FIG. 4 is a perspective view explaining a configuration of an adjacent member arranged on one side in the X-axis direction of the energy storage apparatus on one side in the X-axis direction.
Figure 4:
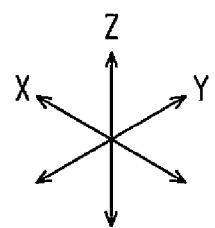

FIG. 4 shows an adjacent member 3 located on one side (right side in FIG. 2) in the X-axis direction of the adjacent members 3 arranged outwardly in the X-axis direction with the energy storage device 2 located at the endmost position. Further, FIG. 4 shows the configuration on one side of the adjacent member 3 in the X-axis direction (the configuration on the side opposite to the side facing the energy storage device 2 in the X-axis direction). The adjacent member 3 includes a plate-shaped main body portion 321 located between the energy storage device 2 and the holding member 4, a frame-shaped connection part 323 extending from the main body portion 321 to an outer position in the Z-axis direction, and a reinforcing part 324 and the like arranged in the connection part 323.

The main body portion 321 is a portion that overlaps the long wall portion 214 of the case 21 of the energy storage device 2 when viewed from the X-axis direction, and extends in the Y-Z plane (the plane including the Y-axis and the Z-axis) direction.

The connection part 323 is a portion that can be connected to a fluid supply member (for example, a duct) capable of supplying a fluid. The connection part 323 of the present embodiment extends from an end edge 3213 located on the other side in the Z-axis direction of the main body portion 321 to the outside (the other side) in the Z-axis direction, and also extends to the outside in the X-axis direction (one side in the X-axis direction, the side opposite to the energy storage device 2 located at the endmost position in the X-axis direction). The connection part 323 has a plate-shaped first part 3231 that extends in the X-axis direction and also extends in the X-Y plane (the plane including the X-axis and the Y-axis) direction from the end edge 3213 of the main body portion 321, a pair of plate-shaped second parts 3232 that is continuous with the end edges of the first part 3231 located on both sides in the Y-axis direction and extend in the X-Z plane (the plane including the X-axis and the Z-axis) direction, respectively, and a third part 3233 that connects the end edges of the pair of second parts 3232 in the Z-axis direction and extends in the Y-axis direction. The dimensions of the first part 3231 in the X-axis direction and the dimensions of the second part 3232 in the X-axis direction are both longer than the dimensions of the third part 3233 in the X-axis direction. A fluid supply member is brought into contact with a frame partitioned by the first part 3231, the pair of second parts 3232, and the third part 3233, and thereby the fluid supply member is connected to the connection part 323 of the present embodiment.

Figure 9:
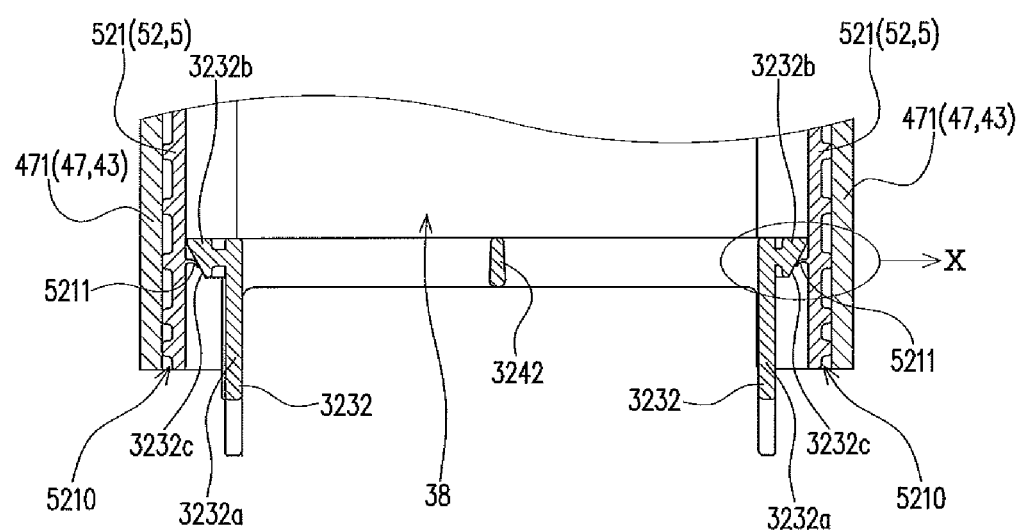
FIG. 9 is a cross-sectional view at an IX-IX position in FIG. 8.
Figure 9:
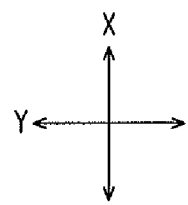
Figure 10:
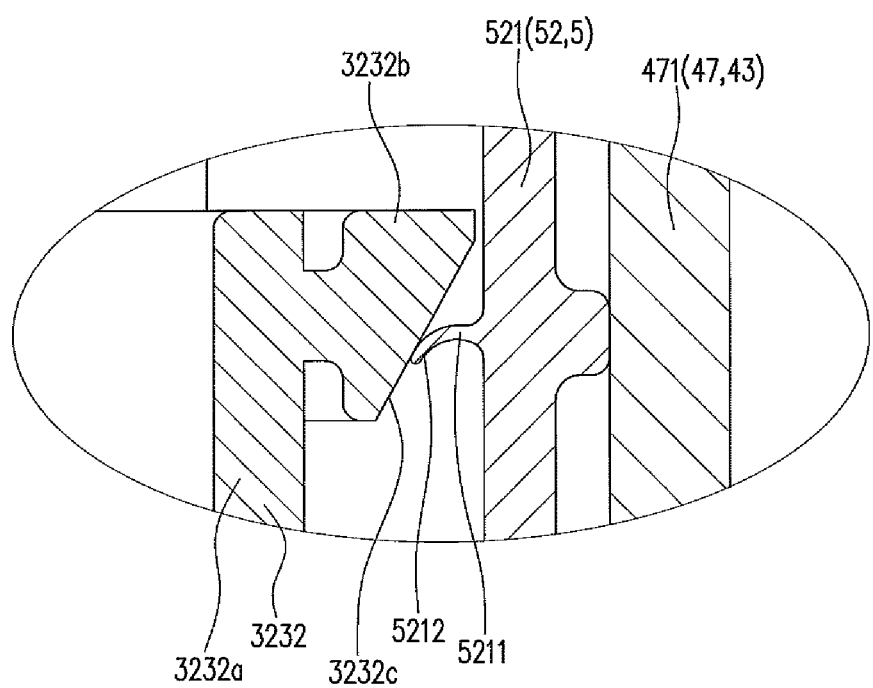
FIG. 10 is an enlarged view of a region X in FIG. 9.
Figure 11:
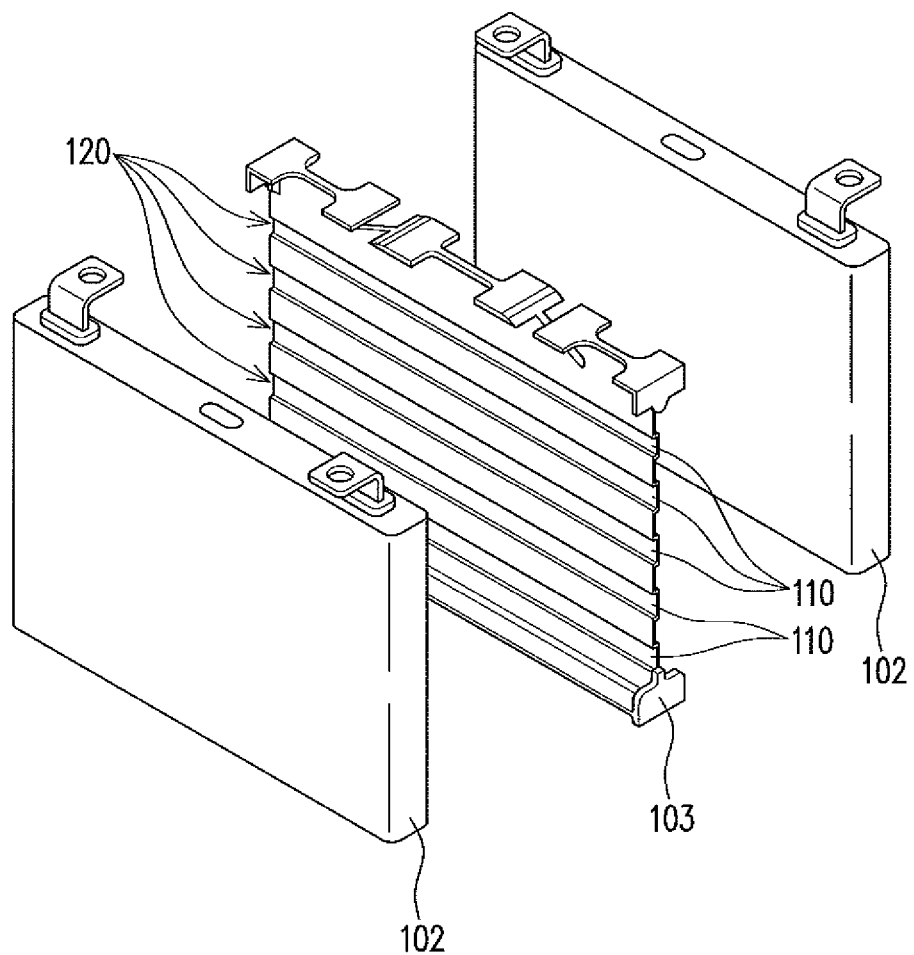
FIG. 11 is a perspective view explaining a conventional energy storage apparatus.

Each of the pair of second parts 3232 of the present embodiment has a flat plate region 3232a continuous with the first part 3231 and extending in the X-Z plane direction, and an extension region 3232b extending from the flat plate region 3232a to the outside in the Y-axis direction. As shown in FIG. 9, the extension region 3232b is arranged at an end portion located inside the flat plate region 3232a in the X-axis direction (the energy storage device 2 side facing the main body portion 321 in the X-axis direction, the other side in the X-axis direction). The outer surface 3232c located outside the extension region 3232b in the Y-axis direction is an inclined surface (seal rib facing surface) inclined with respect to the X-axis direction, for example, is an inclined surface in which a portion located on the outer side in the X-axis direction is located on the inner side in the Y-axis direction.

The reinforcing part 324 has a first part 3241 extending along the Y-axis direction and a second part 3242 extending along the Z-axis direction (see FIGS. 4, 6 to 8). The first part 3241 connects substantially the center positions in the Z-axis direction of the inner (other side) end edges of the pair of second parts 3232 in the X-axis direction. The second part 3242 connects a substantially center position in the Y-axis direction of the end edge 3213 of the main body portion 321 and a substantially center position in the Y-axis direction of the inner (other side) end edge of the third part 3233 in the X-axis direction.

Figure 5:
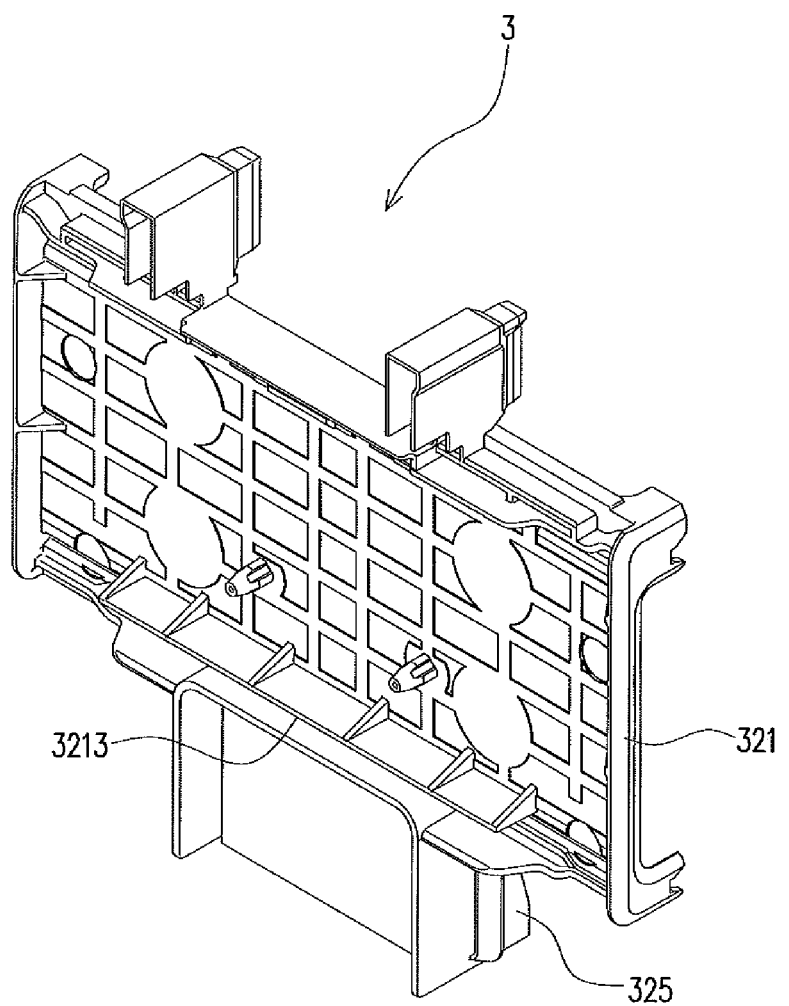
FIG. 5 is a perspective view explaining a configuration of an adjacent member arranged on the other side in the X-axis direction of the energy storage apparatus on the other side in the X-axis direction.
Figure 5:
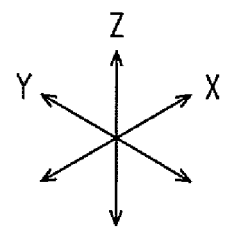

FIG. 5 shows an adjacent member 3 located on the other side (left side in FIG. 2) in the X-axis direction of the adjacent members 3 arranged outwardly in the X-axis direction with the energy storage device 2 located at the endmost position. Further, FIG. 5 shows the configuration of the adjacent member 3 on the other side in the X-axis direction (the configuration on the side opposite to the side facing the energy storage device 2 in the X-axis direction). The adjacent member 3 has a plate-shaped main body portion 321 located between the energy storage device 2 and the holding member 4, a partition wall part 325 extending from the main body portion 321 to an outer position in the Z-axis direction, and the like.

The partition wall part 325 is a part that seals the fluid supplied from the fluid supply member. The partition wall part 325 of the present embodiment extends from the end edge 3213 located on the other side of the main body portion 321 in the Z-axis direction to the outside (the other side) in the Z-axis direction. The partition wall part 325 is a part that overlaps the connection part 323 when viewed from the X-axis direction, and extends in the Y-Z plane (the plane including the Y-axis and the Z-axis) direction.

The holding member 4 holds the plurality of energy storage devices 2 and the plurality of adjacent members 3 together by surrounding the periphery of the plurality of energy storage devices 2 and the plurality of adjacent members 3 (see FIG. 1). The holding member 4 is made of a conductive member such as metal. Specifically, the holding member 4 includes a pair of end members 40 arranged on both sides of the plurality of energy storage devices 2 in the X-axis direction, and connection members 43 connecting the end portions of the end member 40 in the Y-axis direction. Further, the holding member 4 has a fixing member 45 that fixes (connects) the end member 40 and the connection member 43. In the energy storage apparatus 1 of the present embodiment, the pair of connection members 43 connect both end portions of the pair of end members 40 in the Y-axis direction.

Each of the pair of end members 40 is arranged so as to sandwich the adjacent member 3 with the energy storage device 2 arranged at the end in the X-axis direction. Each of these pair of end members 40 includes an end member main body 41 which is a part extending along the Y-Z plane and overlapping with the energy storage device 2 when viewed from the X-axis direction, and an extension portion 42 extending from the end member main body 41.

The end member main body 41 is a rectangular portion corresponding to the energy storage device 2. The extension portion 42 is used to fix the energy storage apparatus 1 to the installation surface. The end member 40 of the present embodiment has two extension portions 42 that are arranged at an interval in the Y-axis direction. In the two extension portions 42, the energy storage apparatus 1 is fixed to the installation region S3 of the installation surface S1 (see FIG. 3).

The pair of connection members 43 is arranged on both sides of the plurality of energy storage devices 2 in the Y-axis direction (see FIG. 2). Each of these pair of connection members 43 includes a connection member main body 44 extending in the X-axis direction along respective short wall portions 215 of the plurality of energy storage devices 2, a first extension portion 46 extending in the Y-axis direction and also extending along the respective closing portions 212 of the plurality of energy storage devices 2 from an end portion of the connection member main body 44 on the other side in the Z-axis direction, and a second extension portion 47 extending from the first extension portion 46 to a position on the other side in the Z-axis direction. Further, each of the pair of connection members 43 has a connected part 48 extending in the Y-axis direction from each end portion of the connection member main body 44 in the X-axis direction along the surface of the end member 40 facing outward in the X-axis direction.

The second extension portion 47 extends along the Z-axis direction from at least a part of the first extension portion 46 in the X-axis direction (see FIG. 2). The fact that the second extension portion 47 extends along the Z-axis direction means that the extension direction of the second extension portion 47 includes a component in the Z-axis direction. The second extension portion 47 of the present embodiment extends from the entire region of the first extension portion 46 in the X-axis direction to a position on the other side in the Z-axis direction. Further, the second extension portion 47 of the present embodiment includes an inclined part 470 extending along the Z-axis direction in a state of being continuous with the first extension portion 46 and inclined with respect to the Z-axis direction, and a parallel part 471 that is continuous with the inclined part 470 and extends parallel to the Z-axis direction (see FIGS. 6 and 7). The inclined part 470 of the present embodiment is inclined so that the portion located on the other side in the Z-axis direction is located on the inner side in the Y-axis direction. Further, the inclined part 470 has a flat plate shape. The tip of the parallel part 471 of the present embodiment in the Z-axis direction is located on the inner side (one side) in the Z-axis direction than the tip (the tip located on the other side in the Z-axis direction) of the extension portion 42 of the end member 40.

The insulator 5 has an insulating property and is arranged between the connection member 43 and the plurality of energy storage devices 2 (see FIG. 2). Further, the insulators 5 are arranged in a pair on both sides of the plurality of energy storage devices 2 in a state of being spaced apart in the Y-axis direction. Each of the pair of insulators 5 is arranged along the plurality of energy storage devices 2. Further, each of the pair of insulators 5 covers at least a region facing a plurality of energy storage devices 2 in the connection member 43. Specifically, each insulator 5 includes a main body covering portion 50 that covers a surface facing each energy storage device 2 in the connection member main body 44, a first covering portion 51 extending from the main body covering portion 50 along the respective closing portions 212 of the plurality of energy storage devices 2, and a second covering portion 52 extending from the first covering portion 51 along the Z-axis direction.

The first covering portion 51 is a portion that covers a surface of the connection member main body 44 facing the respective energy storage devices 2. Specifically, the first covering portion 51 is a part that covers a surface of the first extension portion 46 facing the respective energy storage devices 2. Further, the first covering portion 51 is continuous with the end portion of the main body covering portion 50 in the Z-axis direction and extends along the Y-axis direction. (See FIGS. 2, 6 and 7). The first covering portion 51 of the present embodiment extends from the entire region of the main body covering portion 50 in the X-axis direction of the end portion on the other side in the Z-axis direction (see FIG. 2). Further, the first covering portion 51 of the present embodiment covers the end portion of the closing portion 212 of the energy storage device 2 located on the outer side in the Y-axis direction. In the energy storage apparatus 1 of the present embodiment, since the first covering portion 51 is provided in each of the pair of insulators 5 in the Y-axis direction, the pair of first covering portions 51 covers both end portions in the Y-axis direction of the closing portions 212 of the energy storage device 2.

The second covering portion 52 is a portion that covers a surface of the second extension portion 47 facing inward in the Z-axis direction. Further, the second covering portion 52 is a space forming part that extends from a position along the outer surface of the closing portions 212 of the plurality of energy storage devices 2, which is a position sandwiching the opening 35a in the Z-axis direction, along the Z-axis direction, and partitions a space between the facing region S2 and the outer surface of the closing portion 212 in the installed state (a guide flow channel 38 that guides the fluid to each flow channel 35 in the X-axis direction).

Specifically, the second covering portion 52 is continuous with the end portion of the first covering portion 51 in the Y-axis direction and extends along the Z-axis direction. The second covering portion 52 of the present embodiment extends from the entire region of the first covering portion 51 in the X-axis direction to the other side in the Z-axis direction (see FIG. 2). Further, the second covering portion 52 of the present embodiment extends to a position on one side in the Z-axis direction from the tip (tip located on the other side in the Z-axis direction) of the extension portion 42 of the end member 40 (see FIGS. 6 and 7). Further, the second covering portion 52 of the present embodiment has an inclined part 520 that is continuous with the first covering portion 51 and extends along the Z-axis direction in a state of being inclined with respect to the Z-axis direction, a parallel part 521 that is continuous with the inclined part 520 and extends parallel to the Z-axis direction, and a tip part 522 that is continuous with the parallel part 521 and extends on both sides in the Y-axis direction. The connection part 323 is arranged between the pair of second covering portions 52.

The inclined part 520 covers a surface of the inclined part 470 of the second extension portion 47 facing one side in the Z-axis direction. The inclined part 520 of the present embodiment is inclined so that the portion located on the other side in the Z-axis direction is located on the inner side in the Y-axis direction. The inclined part 520 has a flat plate shape.

The parallel part 521 covers the inner surface of the parallel part 471 of the second extension portion 47 in the Y-axis direction. Further, the parallel part 521 has a seal rib 5211 projecting toward the parallel part 521 facing the parallel part 521 in the Y-axis direction from an end portion 5210 located on the side of the adjacent member 3 (the adjacent member 3 arranged outwardly with the energy storage device 2 located at the endmost position in the X-axis direction) (see FIGS. 9 and 10).

The seal rib 5211 extends along the Z-axis direction. Further, the seal rib 5211 is in contact with an inclined surface 3232c. Specifically, the seal rib 5211 has an extension end 5212 extending inward in the Y-axis direction, and is in contact with the inclined surface 3232c in a state of being curved so that the extension end 5212 is displaced to the other side in the X-axis direction due to elastic deformation. The inclined surface 3232c is an opposing surface (seal rib facing surface) extending along the Z-axis direction at a position facing the seal rib 5211 on the outer surface facing the second covering portion 52 in the Y-axis direction.

The tip part 522 extends from the outer (other side) end edge of the parallel part 521 in the Z-axis direction. Further, the tip part 522 covers the tip surface (for example, a surface facing the other side in the Z-axis direction) of the parallel part 471 of the second extension portion 47. Further, the end face (tip face) on the extension side of the tip part 522 is a flat surface. The tip part 522 of the present embodiment is in contact with the facing region S2 in a state where the closing portion 212 of the energy storage device 2 is separated from the facing region S2 and both ends (a pair of end members 40) of the energy storage apparatus 1 in the X-axis direction are fixed to the installation region S3 (see FIGS. 3, 6, and 7).

The tip part 522 of the present embodiment is indirectly in contact with the facing region S2. Specifically, it is indirectly in contact with the facing region S2 via a seal member 8. The material of the seal member 8 is, for example, softer than the material of the insulator 5.

The bus bar 6 is a plate-shaped member having conductivity such as metal. The bus bar 6 conducts the external terminals 22 of the energy storage device 2 to each other, or the external terminal 22 of the energy storage device 2 and the external input/output terminal 49. A plurality of bus bars 6 are provided in the energy storage apparatus 1 (the number corresponding to the number of the plurality of energy storage devices 2 and the number of external input/output terminals 49). The plurality of bus bars 6 of the present embodiment connect (conduct) all of the plurality of energy storage devices 2 included in the energy storage apparatus 1 in series.

According to the above energy storage apparatus 1, the second covering portions (space forming parts) 52 of the pair of insulators 5 partition the space between the outer surfaces of the closing portions 212 of the plurality of energy storage devices 2 and the facing regions S2 to constitute the guide flow channel 38 for supplying the fluid to each flow channel 35, and therefore it is possible to supply the fluid to each flow channel 35 by using this guide flow channel 38 without using a dedicated fluid supply member.

In the energy storage apparatus 1 of the present embodiment, when the fluid is supplied from the fluid supply member to the guide flow channel 38, which is formed by bringing the second covering portion (space forming part) 52 into contact with the fluid supply member to bring the seal rib 5211 into contact with the seal rib facing surface 3232c, leakage of the fluid from between the second covering portion (space forming part) 52 and the connection part 323 is suppressed.

Moreover, since the seal rib 5211 is in close contact with the seal rib facing surface (inclined surface) 3232c in a state of being curved so that the extension end 5212 is displaced to either one side or the other side in the X-axis direction due to elastic deformation, even if a manufacturing error or an assembly error occurs in the adjacent member 3 or the insulator 5 in the X-axis direction or the Y-axis direction, this error can be absorbed, that is, the airtightness at the inlet of the guide flow channel 38 can be ensured. Further, in the energy storage apparatus 1 of the present embodiment, since the seal rib facing surface 3232c is an inclined surface, the relative position of the seal rib facing surface 3232c with respect to the seal rib 5211 in the X-axis direction changes even if the seal rib 5211 is not sufficiently curved (the position of the connection part 323 of the adjacent member 3 changes with respect to the position of the insulator 5 in the X-axis direction), the seal rib 5211 easily comes into contact with the seal rib facing surface 3232c, so that such an error can be absorbed.

Further, in the energy storage apparatus 1 of the present embodiment, since the reinforcing part 324 (first part 3241) extends between the pair of second parts 3232 of the connection part 323, even if an inward force in the Y-axis direction is applied to the pair of second parts 3232 from the seal rib 5211 of the insulator 5, the reinforcing part 324 receives this force, and thereby it is possible to suppress the deformation of the connection part 323 (the pair of second parts 3232). As a result, the leakage of the fluid supplied from the fluid supply member to the guide flow channel 38 from between the connection part 323 and the second covering portion (space forming part) 52 is surely suppressed.

Further, in the energy storage apparatus 1 of the present embodiment, since the insulator 5 (for example, the tip part 522) is indirectly in contact with the facing region S2 via the seal member 8, and the material of the seal member 8 is softer than the material of the insulator 5, even if the surface of the facing region S2 has an uneven shape, the surface of a part (for example, the tip part 522) that is indirectly in contact with the facing region S2 of the insulator 5 has an uneven shape, or the surface of a part (for example, the tip part 522) that is indirectly in contact with the facing region S2 of the insulator 5 is inclined with respect to the surface of the facing region S2, the insulator 5 is surely in close contact with the facing region S2.

Note that, the energy storage apparatus of the present invention is not limited to the above-described embodiment, and it goes without saying that various modifications can be made within a range not departing from the gist of the present invention. For example, a configuration of another embodiment can be added to a configuration of one embodiment, and a part of the configuration of one embodiment can be replaced with the configuration of another embodiment. In addition, a part of the configuration of one embodiment can be deleted.

For example, the seal rib 5211 may be in contact with the seal rib facing surface 3232c in a state of being curved so that the extension end 5212 is displaced to one side in the X-axis direction due to elastic deformation. In this case, the seal rib facing surface 3232c may be inclined so that the portion located on the outer side in the X-axis direction is located on the outer side in the Y-axis direction. Further, the seal rib 5211 does not have to be elastically deformed. For example, it may have a shape (for example, a flat plate shape that projects inward in the Y-axis direction and along the Y-axis direction) that projects, from the end portion 5210 of the parallel part 521 of the second covering portion 52 (space forming part), toward the facing second covering portion 52 of the pair of second covering portions 52 along the Y-axis direction. Even in this case, if the seal rib facing surface 3232c is an inclined surface, the seal rib 5211 easily comes into contact with the seal rib facing surface 3232c, so that a manufacturing error or an assembly error can be absorbed by the adjacent member 3 or the insulator 5.

The seal rib facing surface 3232c facing the seal rib 5211 of the connection part 323 is not limited to an inclined surface, but may be a flat surface or a curved surface. For example, even if the seal rib facing surface 3232c is a flat surface, the seal rib 5211 may be in contact with the seal rib facing surface 3232c in a state of being curved so that the extension end 5212 is displaced to either one side or the other side in the X-axis direction due to elastic deformation. Even in such a case, since the seal rib 5211 is in close contact with the seal rib facing surface 3232c, even if a manufacturing error or an assembly error occurs in the adjacent member 3 or the insulator 5 in the X-axis direction or the Y-axis direction, this error can be absorbed.

The pair of second covering portions (space forming parts) 52 may have a shape different from that of the seal rib 5211 and may include a contact portion that is in contact with the seal rib facing surface 3232c of the connection part 323.

The shape of the connection part 323 is not limited to the shape of the above embodiment, and may be any shape that can be connected to the fluid supply member.

The number of energy storage devices 2 included in the energy storage apparatus 1 is not limited to a plurality, and may be one. In other words, the number of energy storage devices 2 included in the energy storage apparatus 1 may be at least one.

DESCRIPTION OF REFERENCE SIGNS

1: energy storage apparatus
2: energy storage device
21: case
22: external terminal
211: case body
212: closing portion
213: body portion
214: long wall portion
215: short wall portion
216: lid plate
3: adjacent member
315: bolt
321: main body portion
3213: end edge
323: connection part
3231: first part
3232: second part
3232a: flat plate region
3232b: extension region
3232c: inclined surface (seal rib facing surface, outer surface)
3233: third part
324: reinforcing part
3241: first part
3242: second part
325: partition wall part
35: flow channel
35a: inlet (opening)
35b: outlet (opening)
38: guide flow channel
4: holding member
40: end member
41: end member main body
42: extension portion
43: connection member
44: connection member main body
441: beam part
442: end connection part
443: intermediate connection part
45: fixing member
46: first extension portion
47: second extension portion
470: inclined part
471: parallel part
48: connected part
49: external input/output terminal
5: insulator
50: main body covering portion (insulator main body portion)
51: first covering portion
52: second covering portion (space forming part, guide flow channel forming part)
520: inclined part
521: parallel part
5210: end portion
5211: seal rib
5212: extension end
522: tip part
53: beam covering portion
54: end portion covering portion
55: intermediate covering portion
6: bus bar
8: seal member
102: battery cell
103: spacer
110: groove
120: cooling gap (flow channel)
S1: installation surface
S2: facing region (opposing surface)
S3: installation region

The invention claimed is:

1. An energy storage apparatus, comprising:
a plurality of energy storage devices arranged in a first direction; and
a pair of insulators extending in the first direction along the plurality of energy storage devices and arranged at an interval from each other in a second direction orthogonal to the first direction,
wherein each of the plurality of energy storage devices includes an outer surface facing a third direction orthogonal to the first direction and the second direction, and
wherein each of the pair of insulators includes:
a first portion extending in the first direction and the second direction; and a second portion bending from the first portion and extending from a position on the outer surface in the third direction, the second portion forming a space forming part which includes a space between a facing surface, on which the energy storage apparatus is installed, and the outer surface.

2. The energy storage apparatus according to claim 1, wherein between the adjacent energy storage devices, a flow channel is formed which opens between the outer surfaces when the outer surfaces are viewed in the third direction and through which a fluid for temperature adjustment is allowed to flow.

3. The energy storage apparatus according to claim 2, further comprising an adjacent member arranged outwardly in the first direction with an energy storage device located at an endmost position of the plurality of energy storage devices,
wherein one of the pair of space forming parts has a seal rib protruding from an end portion close to the adjacent member in the first direction toward an other of the pair of space forming parts and extending along the third direction,
wherein the adjacent member has, between the pair of space forming parts in the second direction, a connection part extending in the first direction away from the energy storage device located at the endmost position and connectable to a fluid supply member capable of supplying the fluid,
wherein the connection part has a seal rib facing surface extending in the third direction at a position facing the seal rib in the second direction in an outer surface facing the space forming part, and
wherein the seal rib is in contact with the seal rib facing surface.

4. The energy storage apparatus according to claim 3, wherein the seal rib is in contact with the seal rib facing surface in a state of being curved so that an extension end is displaced to either one side or an other side in the first direction due to elastic deformation.

5. An energy storage apparatus, comprising:
a plurality of energy storage devices arranged in a first direction; and
a pair of insulators extending in the first direction along the plurality of energy storage devices and arranged at an interval from each other in a second direction orthogonal to the first direction,
wherein each of the plurality of energy storage devices includes an outer surface facing a third direction orthogonal to the first direction and the second direction,
wherein each of the pair of insulators includes:
an insulator main body portion extending in the first direction along the plurality of energy storage devices;
a first portion extending from the insulator main body portion along the outer surface, and extending in the first direction and the second direction; and
a second portion bending from the first portion, and extending in the third direction from a position on the outer surface toward a facing surface on which the energy storage apparatus is installed, and
wherein a space surrounded by the outer surface, the second portions of the pair of insulators, and the facing surface extends in the first direction.

6. The energy storage apparatus according to claim 1, wherein the second portion includes an inclined part that bends downward from the first portion at an incline with respect to the second direction.

7. The energy storage apparatus according to claim 1, wherein the second portion includes a parallel part that extends parallel to the third direction.

8. The energy storage apparatus according to claim 1, wherein the second portion includes:
an inclined part that bends downward from the first portion at an incline with respect to the second direction; and
a parallel part that extends from the incline part downward parallel to the third direction.

9. The energy storage apparatus according to claim 8, wherein the parallel part includes a seal rib that extends along the parallel part in the third direction.

10. The energy storage apparatus according to claim 9, wherein the seal rib includes an extension end extending inward in the second direction and in contact with the inclined part.

11. The energy storage apparatus according to claim 1, further comprising a pair of connection members arranged on both sides of the plurality of energy storage devices in the second direction,
wherein each of the pair of connection members includes:
a connection member main body extending in the first direction along the plurality of energy storage devices;
a first extension portion extending in the second direction and also extending along the plurality of energy storage devices from an end portion of the connection member main body on an other side in the third direction; and
a second extension portion extending from the first extension portion to a position on an other side in the third direction.

12. The energy storage apparatus according to claim 11, wherein each of the pair of connection members further includes a connected part extending in the second direction from the end portion of the connection member main body in the first direction.

13. The energy storage apparatus according to claim 11, wherein the second extension portion extends along the third direction from at least a part of the first extension portion in the third direction.

14. The energy storage apparatus according to claim 11, wherein the second extension portion includes a component in the third direction.

15. The energy storage apparatus according to claim 11, wherein the second extension portion includes:
an inclined part extending along the third direction in a state of being continuous with the first extension portion and inclined with respect to the third direction; and
a parallel part that is continuous with the inclined part and extends parallel to the third direction.

16. The energy storage apparatus according to claim 1, further comprising an adjacent member that has a structure such that, between the adjacent member and an adjacent energy storage device of the plurality of energy storage devices, a plurality of flow channels for which a fluid for temperature adjustment,
wherein the adjacent member includes:
a plate-shaped main body portion located between the adjacent energy storage device of the plurality of energy storage devices and a holding member; and
a partition wall part extending from the plate-shaped main body portion to an outer position in the third direction.

17. The energy storage apparatus according to claim 5, wherein the second portion includes:
   an inclined part that bends downward from the first portion at an incline with respect to the second direction; and
   a parallel part that extends from the incline part downward parallel to the third direction.

18. The energy storage apparatus according to claim 5, further comprising a pair of connection members arranged on both sides of the plurality of energy storage devices in the second direction,
   wherein each of the pair of connection members includes:
      a connection member main body extending in the first direction along the plurality of energy storage devices;
      a first extension portion extending in the second direction and also extending along the plurality of energy storage devices from an end portion of the connection member main body on an other side in the third direction; and
      a second extension portion extending from the first extension portion to a position on an other side in the third direction.

19. The energy storage apparatus according to claim 18, wherein the second extension portion includes:
   an inclined part extending along the third direction in a state of being continuous with the first extension portion and inclined with respect to the third direction; and
   a parallel part that is continuous with the inclined part and extends parallel to the third direction.

20. An energy storage apparatus, comprising:
   a plurality of energy storage devices arranged in a first direction;
   an adjacent member arranged in the first direction with an adjacent energy storage device of the plurality of energy storage device, the adjacent member include a flow channel between the adjacent energy storage device and the adjacent member to through a fluid for temperature adjustment of the adjacent energy storage device; and
   a pair of insulators extending in the first direction along the plurality of energy storage devices and arranged at an interval from each other in a second direction orthogonal to the first direction,
   wherein each of the plurality of energy storage devices includes an outer surface facing a third direction orthogonal to the first direction and the second direction, and
   wherein each of the pair of insulators includes:
      a first portion extending in the first direction and the second direction; and
      a second portion bending from the first portion and extending in the third direction from a position on the outer surface toward a facing surface on which the energy storage apparatus is installed, the fluid flows from the second portion to the flow channel.

* * * * *